(12) United States Patent
Ono et al.

(10) Patent No.: US 7,090,900 B2
(45) Date of Patent: Aug. 15, 2006

(54) LIQUID CRYSTAL ALIGNING AGENT FOR VERTICAL ALIGNMENT, ALIGNMENT LAYER FOR LIQUID CRYSTAL, AND LIQUID CRYSTAL DISPLAYS MADE BY USING THE SAME

(75) Inventors: Go Ono, Chiba (JP); Kio Mizuno, Chiba (JP); Hideyuki Endo, Chiba (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 10/494,511

(22) PCT Filed: Nov. 15, 2002

(86) PCT No.: PCT/JP02/11948

§ 371 (c)(1),
(2), (4) Date: Oct. 20, 2004

(87) PCT Pub. No.: WO03/042752

PCT Pub. Date: May 22, 2003

(65) Prior Publication Data

US 2005/0058780 A1 Mar. 17, 2005

(30) Foreign Application Priority Data

Nov. 15, 2001 (JP) .............................. 2001-350017

(51) Int. Cl.
*C08G 73/10* (2006.01)
*G02F 1/1337* (2006.01)

(52) U.S. Cl. ..................... 428/1.2; 428/1.25; 428/1.26; 528/170; 528/188; 528/353; 349/123; 349/124; 349/130; 349/135

(58) Field of Classification Search ................. 428/1.2, 428/1.25–1.26, 473.5; 528/170, 188, 353; 349/123–124, 130, 135
See application file for complete search history.

(56) References Cited

U.S. PATENT DOCUMENTS

| | | | |
|---|---|---|---|
| 5,608,033 A | | 3/1997 | Nihira et al. ............... 428/1.25 |
| 5,665,856 A | | 9/1997 | Nihira et al. ............... 528/353 |
| 5,858,274 A | * | 1/1999 | Mishina et al. .......... 252/299.4 |
| 5,861,534 A | | 1/1999 | Nihira et al. ............... 564/305 |
| 5,954,999 A | * | 9/1999 | Mishina et al. .......... 252/299.4 |
| 6,139,917 A | * | 10/2000 | Sano et al. ................ 427/385.5 |
| 6,294,639 B1 | * | 9/2001 | Sawahata et al. ........... 528/170 |
| 6,740,371 B1 | | 5/2004 | Hosaka et al. ............... 428/1.2 |

FOREIGN PATENT DOCUMENTS

| | | |
|---|---|---|
| EP | 575986 | 12/1993 |
| EP | 1037092 | 9/2000 |
| JP | 8-328017 | 12/1996 |
| JP | 2000-63515 | 2/2000 |

OTHER PUBLICATIONS

U.S. Appl. No. 10/494,511, filed May 13, 2004, Ono et al.
U.S. Appl. No. 10/398,746, filed Apr. 15, 2003, Mano et al.
U.S. Appl. No. 10/312,877, filed Jan. 2, 2003, Sawahata et al.
U.S. Appl. No. 10/479,972, filed Dec. 12, 2003, Yamada et al.

* cited by examiner

*Primary Examiner*—William P. Watkins, III
*Assistant Examiner*—Sow-Fun Hon
(74) *Attorney, Agent, or Firm*—Oblon, Spivak, McClelland, Maier & Neustadt, P.C.

(57) ABSTRACT

A liquid crystal alignment treating agent containing a polyamic acid which is represented by the following formula (I) and exhibits a reduced viscosity of from 0.05 to 5.0 dl/g (in N-methyl-2-pyrrolidone at 30° C. at a concentration of 0.5 g/dl) or a polyimide obtained by cyclodehydration thereof:

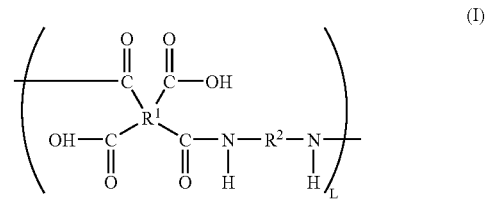

(I)

wherein $R^1$ represents a tetravalent organic group, at least 20 mol % of which has a fused alicyclic structure composed of two to five rings, and all of the carbonyl groups are directly bonded to the alicyclic structure and that any two carbonyl groups are not bonded to adjacent carbon atoms of the alicyclic structure; $R^2$ is a bivalent organic group, from 20 to 100 mol % of which has in the side-chain structure at least one structural unit selected from the group consisting of $C_{5-20}$ long-chain alkyl, $C_{5-20}$ fluoroalkyl, alicyclic structures and aromatic ring structures; and L is a positive integer.

9 Claims, No Drawings

LIQUID CRYSTAL ALIGNING AGENT FOR VERTICAL ALIGNMENT, ALIGNMENT LAYER FOR LIQUID CRYSTAL, AND LIQUID CRYSTAL DISPLAYS MADE BY USING THE SAME

This application is a 371 of PCT/JP02/11948 filed Nov. 15, 2002

TECHNICAL FIELD

The present invention relates to a liquid crystal alignment treating agent, an alignment film for liquid crystal, and a liquid crystal display device employing the same. More particularly, the present invention relates to a liquid crystal alignment treating agent for vertical alignment, which is excellent in printing properties, capable of aligning liquid crystal molecules vertically to a substrate stably and capable of providing an excellent voltage retention property and an excellent accumulation voltage property when a liquid crystal cell is driven.

BACKGROUND ART

A vertical alignment system, which utilizes a birefringent change of a liquid crystal layer when a nematic liquid crystal having a negative dielectric anisotropism is vertically aligned to a substrate and a voltage is applied by an electrode formed on the substrate, is known to show a high contrast as compared with a conventional TN system. As a liquid crystal alignment film to be used for such a vertical alignment system, a polyimide containing a long-chain alkyl group is disclosed, as described in e.g. JP-A-6-3678. However, with the liquid crystal alignment film to be used in such a vertical alignment system, it was difficult to carry out uniform alignment treatment by rubbing treatment as in the conventional TN system.

On the other hand, a vertical alignment system has been developed in recent years, wherein the direction of the electrical field is controlled by changing the structure of an electrode or projections formed on a substrate, whereby the alignment direction of liquid crystal is controlled during applying a voltage, without rubbing treatment. In such a vertical alignment system, a wide visual field angle property is obtainable as well as the high contrast, whereby a liquid crystal display device having a high display quality can be obtained. A liquid crystal alignment treating agent to be used in such a vertical alignment system, is usually coated on a substrate surface by means of a printing method and fired, whereby it is necessary to use a liquid crystal alignment treating agent showing high coating uniformity during the printing. Further, an active driving using TFT is employed for the liquid crystal display device of such a vertical alignment system, whereby it is necessary to use a liquid crystal alignment film having not only the vertical alignment properties, but also excellent electrical characteristics.

In the case of forming a liquid crystal alignment film, it is usually coated on a substrate by means of a printing method. However, a liquid crystal alignment treating agent for vertical alignment contains hydrophobic side chain substituents such as long-chain alkyl groups in order to align liquid crystal vertically, whereby there was a problem that when it was coated on a substrate, coating uniformity was not necessarily sufficient.

Further, in a case where a treating agent for vertical alignment is coated on a substrate and fired, it is usually fired at a relatively low temperature, since the heat resistance of the side chain structure is low as compared with the main chain structure. However, in a case where a polyamic acid is fired at a relatively low temperature of e.g. at most 200° C., there have been problems such as deterioration of the voltage retention properties due to an insufficient imidation reaction of a polyamic acid, or substantial deterioration of the display quality due to accumulation of a voltage in the liquid crystal display device during applying the voltage to the liquid crystal display device. Especially, it is important to have a high voltage retention property at a high temperature from the viewpoint of reliability of the liquid crystal display device. However, a liquid crystal alignment film for vertical alignment, which is prepared from the conventional polyamic acid, has not necessarily had a sufficient voltage retention property at a high temperature.

On the other hand, in a liquid crystal alignment film to be used for a liquid crystal display device in a TN method, a soluble polyimide as described in e.g. JP-A-2-287324, is known to have a high voltage retention property even if firing is carried out at a relatively low temperature. However, in the case of a vertical alignment film, the printing properties are substantially deteriorated by the effect of the side chain substituents as described above, whereby it is difficult to form a uniform coating film. Further, in the case of a soluble polyimide with a high content ratio of the hydrophobic side chain substituents, there was a problem that it did not have a voltage retention property as high as a liquid crystal alignment film to be used in a TN system.

Thus, the present invention is to provide a liquid crystal alignment treating agent for vertical alignment and a material for a liquid crystal alignment film for vertical alignment, which is excellent in voltage retention properties, particularly excellent in voltage retention properties at a high temperature, has a low accumulation voltage in a liquid crystal display device, and is excellent in film coating uniformity, even if it is a alignment film wherein the imidation reaction has not sufficiently proceeded, while it is excellent in printing properties, voltage retention properties and accumulation voltage properties in the same manner even if it is a soluble polyimide.

DISCLOSURE OF THE INVENTION

In the present invention, the present inventors have diligently made studies on the above problems, and as a result, have found it possible to produce a liquid crystal alignment treating agent for vertical alignment and a material for a liquid crystal alignment film for vertical alignment, which has excellent printing properties, and provides excellent effects to voltage retention properties, or against residual images or burn-in when a liquid crystal cell is prepared, by using a liquid crystal alignment agent having a specific structure.

Namely, the present invention relates to a liquid crystal alignment treating agent for vertical alignment to be used in a liquid crystal display device which has an electrode on at least one of the pair of substrates and is driven by applying a voltage to a vertically aligned liquid crystal, characterized by containing a polyamic acid which is represented by the following formula (I) and exhibits a reduced viscosity of from 0.05 to 5.0 dl/g (in N-methyl-2-pyrrolidone at 30° C. at a concentration of 0.5 g/dl) or a polyimide obtained by cyclodehydration thereof, a liquid crystal alignment film which is formed by coating the liquid crystal alignment treating agent on the substrate and then firing, and a liquid crystal display device using the same.

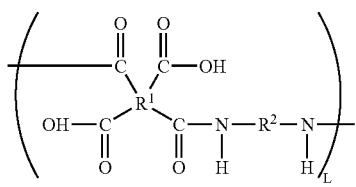

(I)

wherein $R^1$ represents a tetravalent organic group, at least 20 mol % of which has a fused alicyclic structure composed of two to five rings, and further all of the carbonyl groups are directly bonded to the alicyclic structure and that any two carbonyl groups are not bonded to adjacent carbon atoms of the alicyclic structure; $R^2$ is a bivalent organic group, 20 to 100 mole % of which has in the side-chain structure at least one kind of structural units selected from the group consisting of $C_{5-20}$ long-chain alkyl, $C_{5-20}$ fluoroalkyl, alicyclic structures and aromatic ring structures; and L represents a polymerization degree, and is a positive integer.

BEST MODE FOR CARRYING OUT THE INVENTION

The polyamic acid represented by the formula (I), is a polymer constituting the resin component in the liquid crystal alignment treating agent of the present invention, and a method to obtain it is not particularly limited. Usually, a tetracarboxylic acid derivative having $R^1$ and a diamine having $R^2$ are reacted and polymerized in a polar solvent such as N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide or butyrolactone, to obtain a polyamic acid. As the tetracarboxylic acid derivative to be used here, it is common to employ a tetracarboxylic dianhydride.

The molar ratio of the tetracarboxylic acid derivative to the diamine is preferably from 0.8 to 1.2. In the same manner as in a usual polycondensation reaction, the closer to 1 this molar ratio becomes, the larger the polymerization degree of the produced polymer becomes. If the polymerization degree is too small, the strength of a polyimide coating film will be insufficient, and further, if the polymerization degree is too large, the workability at the time of forming the polyimide coating film will sometimes deteriorate. The reaction temperature of the tetracarboxylic acid derivative and the diamine can be selected from −20° C. to 150° C., and preferably from −5° C. to 100° C.

The polymerization degree of the polyamic acid, which is a product by the reaction of the tetracarboxylic acid derivative and the diamine, is preferably from 0.05 to 5.0 dl/g, more preferably from 0.5 to 2.0 dl/g, as represented by the reduced viscosity of the polyamic acid solution. Here, in the present invention including the cases of the following Examples, the reduced viscosity is a value at a concentration of 0.5 g/dl in N-methyl-2-pyrrolidone at a temperature of 30° C.

In the formula (I), it is essential that $R^1$ represents a tetravalent organic group, at least 20 mol % of which has an alicyclic structure having 2 to 5 (preferably 2 or 3) rings fused, and further all carbonyl groups are directly bonded to the alicyclic structure and such carbonyl groups are not bonded to adjacent carbon atoms of the alicyclic structure (hereinafter referred to as the specific tetravalent organic group).

The specific tetravalent organic group in the present invention is preferably of the following formula (II):

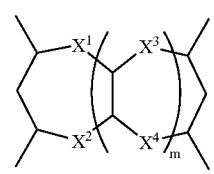

(II)

wherein each of $X^1$, $X^2$, $X^3$ and $X^4$ is independently a single bond or a methylene group; and m is an integer of from 1 to 3.

As a specific example of a tetracarboxylic dianhydride having such a tetravalent organic group, bicyclo[3,3,0]-octane-2,4,6,8-tetracarboxylic dianhydride, bicyclo[4,3,0]nonane-2,4,7,9-tetracarboxylic dianhydride, bicyclo[4,4,0]decane-2,4,7,9-tetracarboxylic dianhydride, bicyclo[4,4,0]decane-2,4,8,10-tetracarboxylic dianhydride or tricyclo[6.3.0.0<2,6>]unedecane-3,5,9,11-tetracarboxylic dianhydride may, for example, be mentioned. The tetracarboxylic dianhydride has structural isomers, and one of the isomers may be used, or a mixture of the isomers may be used.

Further, from the viewpoint of the stability of liquid crystal alignment, the tetravalent organic group of the specific structure in the present invention is more preferably of the following formula (III):

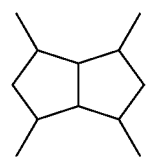

(III)

A tetracarboxylic dianhydride having such a tetravalent organic group is a bicyclo[3,3,0]octane-2,4,6,8-tetracarboxylic dianhydride, which is particularly preferably used to obtain a polyamic acid of the formula (I). As the bicyclo[3,3,0]octane-2,4,6,8-tetracarboxylic acid, isomers represented by the following formulae [V], [VI] and [VII] are present.

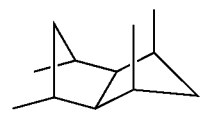

[V]

-continued

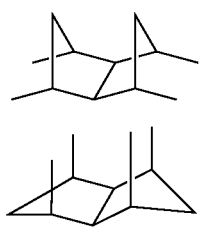

[VI]

[VII]

In the present invention, one of the above isomers or a mixture thereof can be used, but from the point of polymerization reactivity, the content of the isomer [V] is preferably at least 90%, and more preferably at least 95%.

A process for producing tetracarboxylic dianhydride having the formula (II) or the formula (III) is not particularly limited. For example, with respect to bicyclo[3,3,0]octane-2,4,6,8-tetracarboxylic dianhydride, 2,5-norbornadiene and dicyclopentadiene are reacted for 20 hours at 190° C. in an autoclave to prepare tetracyclo[6.2.1.1<3,6>.0<2,7>]dodeca-4,9-diene. Then, the material is subjected to ozone oxidation at a temperature of at most −30° C. in methanol, and further, to oxidative destruction using hydrogen peroxide in a mixed solvent of formic acid and acetic acid, whereby bicyclo[3.3.0]octane-2,4,6,8-tetracarboxylic acid (hereinafter referred to simply as BOTC) is obtained. The tetracarboxylic acid is subjected to heat treatment with acetic anhydride to prepare bicyclo[3.3.0]octane-2,4,6,8-tetracarboxylic dianhydride. Further, BOTC can be obtained also by oxidizing tetracyclo[6.2.1.1<3,6>.0<2,7>]dodeca-4,9-diene with potassium permanganate.

At least 20 mol % of $R^1$ of the formula (I) is required to be the specific tetravalent organic group, but preferably at least 30 mol %, and more preferably at least 50 mol % is such an organic group. So long as the object of the present invention is not impaired, the rest of $R^1$ may be other tetravalent organic groups. In order to obtain a polyamic acid wherein the specific tetravalent organic group and other tetravalent organic groups are mixed as $R^1$, a tetracarboxylic acid derivative having the specific tetravalent organic group and a tetracarboxylic acid derivative having other tetravalent organic groups may be used together when the tetracarboxylic acid derivative and the diamine are reacted. The respective component ratios of the tetracarboxylic acid derivatives used for the reaction with the diamine will be the component ratios of $R^1$ in the polyamic acid, as they are.

Further, in order for a liquid crystal alignment film obtained from the liquid crystal alignment treating agent of the present invention to show a sufficient vertical alignment property, it is necessary to introduce, as $R^2$ of the formula (I), a structure having the after-mentioned vertical alignment component in the side chain, in a large amount as compared with a usual horizontal alignment film. A diamine having such $R^2$ usually has a low reactivity with a tetracarboxylic dianhydride. Especially when it is combined with a tetracarboxylic dianhydride having the specific tetravalent organic group, it will be sometimes difficult to obtain a polyamic acid having a high polymerization degree, or the polymerization reaction will sometimes require a high temperature and a long time. Therefore, it is preferably used in combination with at least 1%, more preferably at least 10 mol %, and furthermore preferably at least 20 mol %, of a tetracarboxylic dianhydride having a high polymerization reactivity with the diamine.

As a specific example of the tetracarboxylic dianhydride having other tetravalent organic groups as $R^1$, the following may be mentioned. An aromatic tetracarboxylic dianhydride such as pyromellitic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,3,6,7-anthracenetetracarboxylic dianhydride, 1,2,5,6-anthracenetetracarboxylic dianhydride, 3,3',4,4'-biphenyltetracarboxylic dianhydride, 2,3,3',4-biphenyltetracarboxylic dianhydride, bis(3,4-dicarboxyphenyl) ether dihydride, 3,3',4,4'-benzophenonetetracarboxylic dianhydride, bis(3,4-dicarboxyphenyl)sulfone dianhydride, bis(3,4-dicarboxyphenyl)methane dianhydride, 2,2-bis(3,4-dicarboxyphenyl)propane dianhydride, 1,1,1,3,3,3-hexafluoro-2,2'-bis(3,4-dicarboxyphenyl)propane dianhydride, bis(3,4-dicarboxyphenyl)dimethylsilane dianhydride, bis(3,4-dicarboxyphenyl)diphenylsilane dianhydride, 2,3,4,5-pyridinetetracarboxylic dianhydride or 2,6-bis(3,4-dicarboxyphenyl)pyridine dianhydride; an alicyclic tetracarboxylic dianhydride such as 1,2,3,4-cyclobutane tetracarboxylic dianhydride, 1,2,3,4-tetramethyl-1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,2,3,4-cycloheptane tetracarboxylic dianhydride, 2,3,4,5-tetrahydrofurane tetracarboxylic dianhydride, 1,2,4,5-cyclohexane tetracarboxylic dianhydride, 3,4-dicarboxy-1-cyclohexyl succinic dianhydride or 3,4-dicarboxy-1,2,3,4-tetrahydro-1-naphthalene succinic dianhydride; or an aliphatic tetracarboxylic dianhydride such as butanetetracarboxylic dianhydride.

Among them, from the viewpoint of maintaining a high voltage retention property, $R^1$, as other tetravalent organic groups, is preferably at least one selected from the following structures:

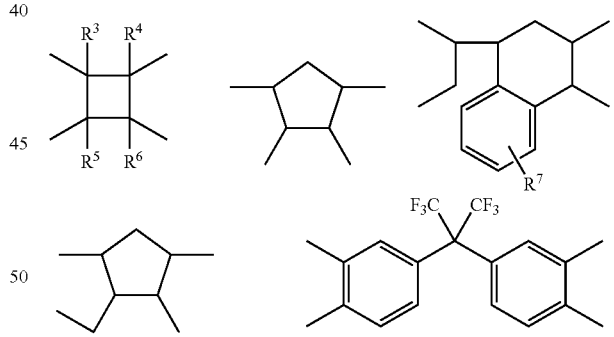

wherein each of $R^3$, $R^4$, $R^5$, $R^6$ and $R^7$ is independently hydrogen or a methyl group. As a specific example of tetracarboxylic dianhydride having such a structure, the following may be mentioned. 1,2,3,4-cyclobutane tetracarboxylic dianhydride, 1,2,3,4-tetramethyl-1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,2,4,5-cyclohexane tetracarboxylic dianhydride, 3,4-dicarboxy-1-cyclohexyl succinic dianhydride, 3,4-dicarboxy-1,2,3,4-tetrahydro-1-naphthalene succinic dianhydride or 1,1,1,3,3,3-hexafluoro-2,2'-bis(3,4-dicarboxyphenyl)propane dianhydride. Especially, from the viewpoint of the balance of the degree of the voltage retention ratio and the reactivity with the diamine, 1,2,3,4-cyclobutane tetracarboxylic dianhydride is more preferred.

Thus, in the present invention, it is preferred that as a specific example of $R^1$ of the formula (I), from 20 to 99 mol %, more preferably from 30 to 90 mol %, and further more preferably from 50 to 80 mol % of $R^1$, is a tetravalent organic group represented by the formula (III):

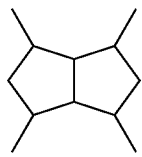

(III)

and the rest of $R^1$ is at least one tetravalent organic group selected from the following structures:

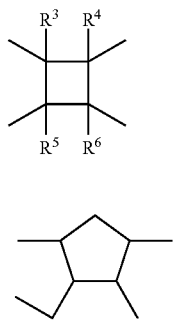
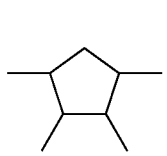
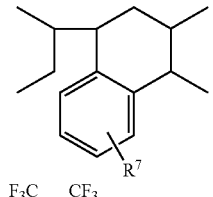
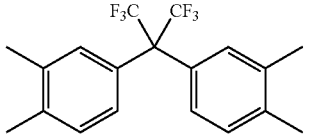

wherein each of $R^3$, $R^4$, $R^5$, $R^6$ and $R^7$ is independently hydrogen or a methyl group.

In the formula (I), $R^2$ represents a bivalent organic group, and from the viewpoint of the stable vertical alignment property of liquid crystal molecules, from 20 to 100 mol %, preferably from 30 to 100 mol %, and more preferably from 50 to 100 mol %, is required to be an organic group having at least one structural unit selected from the group consisting of $C_{5-20}$ (preferably $C_{10-20}$) long-chain alkyl, $C_{5-20}$ fluoroalkyl, alicyclic structures and aromatic ring structures, in its side chain structure.

As a specific example of the diamine with $R^2$ having the above side chain structure, the following may be mentioned. 1,3-diamino-4-dodecyloxybenzene, 1,3-diamino-4-hexadecyloxybenzene, 1,3-diamino-4-octadecyloxybenzene, 2,2-bis[4-(4-aminophenoxy)phenyl]octane, 4,4'-diamino-3-dodecyldiphenyl ether, 4-(4-trans-n-heptylcyclohexylphenoxy)-1,3-diaminobenzene, 4-(4-trans-n-pentylcyclohexylphenoxy)-1,3-diaminobenzene, 4-trans-n-pentylbicyclohexyl-3,5-diaminobenzoate or a diaminobenzene derivative having the following structure:

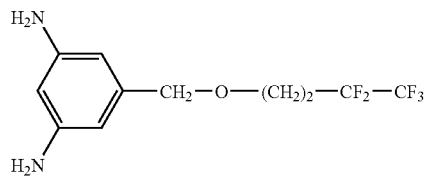

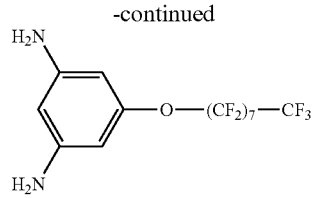

or having a cholesterol skeleton in the side chain, etc.

Further, so long as the object of the present invention is not impaired, $R^2$ may be other bivalent organic groups. As a specific example of diamine having such other bivalent organic groups, the following may be mentioned. An aromatic diamine such as p-phenylenediamine, 1,4-bis(4-aminophenyl)benzene, 1,5-naphthalenediamine, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diamino-biphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenylether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane or 1,1,1,3,3,3-hexafluoro-2,2-bis[4-(4-aminophenoxy)phenyl]propane; an alicyclic diamine such as diaminodicyclohexylmethane, diaminodicyclohexyl ether or diaminocyclohexane; an aliphatic diamine such as 1,2-diaminoethane, 1,3-diaminopropane, 1,4-diaminobutane or 1,6-diaminohexane; or the like, and further a diaminocyloxane such as a compound of the following formula (p is an integer of from 1 to 10):

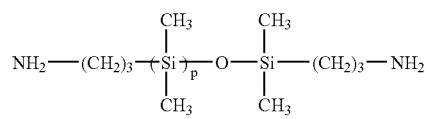

Among them, p-phenylenediamine, 1,4-bis(4-aminophenyl)benzene, 1,5-naphthalenediamine, 4,4'-diaminobiphenyl, 3,3'-dimethyl-4,4'-diaminobiphenyl, 3,3'-dimethoxy-4,4'-diaminobiphenyl or 3,3'-dihydroxy-4,4'-diaminobiphenyl is preferred since it shows high polymerization reactivity.

For the liquid crystal alignment treating agent of the present invention, a solution of the polyamic acid represented by the formula (I) may be used, as it is. Otherwise, it may be a solution of a solvent soluble polyimide having a part or all of the amic acid cyclodehydrated. Further, it may be a mixture thereof.

A method to obtain the solvent soluble polyimide is not particularly limited, but usually a polyamic acid obtained by reacting a tetracarboxylic dianhydride and a diamine, is imidized, as it is in its solution, to obtain a solvent soluble polyimide solution. At that time, in order to convert the polyamic acid to the polyimide, a method of cyclodehydration by heating or a method of carrying out ring closure chemically by using a known cyclodehydration catalyst, is utilized. In the method by means of heating, an optional temperature of from 100° C. to 300° C., preferably from 120° C. to 250° C., can be selected. In the method of chemical ring-closure, pyridine or trimethylamine may, for example, be used in the presence of acetic anhydride or the like, and as the temperature at that time, an optional temperature of from −20° C. to 200° C. may be selected.

The liquid crystal alignment treating agent of the present invention can be used by mixing at least one of the polyamic acids represented by the formula (I) or the polyimides having the polyamic acids cyclodehydrated, with a polyamic acid which is represented by the following formula (IV) and exhibits a reduced viscosity of from 0.05 to 5.0 dl/g:

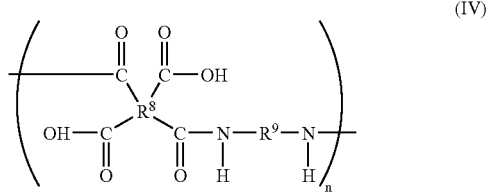

(IV)

wherein $R^8$ represents a tetravalent organic group; $R^9$ represents a bivalent organic group; n represents a polymerization degree and is a positive integer.

The effect of the present invention can be sufficiently obtained even if the resin component contained in the liquid crystal alignment treating agent of the present invention, is only at least one of the polyamic acids represented by the formula (I) or the polyimides having the polyamic acids cyclodehydrated. However, by mixing the polyamic acid represented by the formula (IV), further improvement of the properties can be expected. The effects of mixing the polyamic acid represented by the formula (IV) to the liquid crystal alignment treating agent of the present invention, may, for example, be improvement of the wetting properties to the substrate at the time of coating the liquid crystal alignment treating agent of the present invention on the substrate, improvement of the adhesion between the substrate and the liquid crystal alignment film, or further lowering of the accumulated charge of the liquid crystal cell.

A method to obtain the polyamic acid represented by the formula (IV) is not particularly limited. Usually, a tetracarboxylic acid derivative having $R^8$ and a diamine having $R^9$ are reacted and polymerized in a polar solvent such as N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide or butyrolactone, to prepare a polyamic acid. As the tetracarboxylic acid derivative to be used here, it is common to employ a tetracarboxylic dianhydride.

The molar ratio of the tetracarboxylic acid derivative to the diamine is preferably from 0.8 to 1.2. In the same manner as in a usual polycondensation reaction, the closer to 1 the molar ratio becomes, the larger the polymerization degree of the produced polymer becomes. If the polymerization degree is too small, the strength of the polyimide coating film tends to be insufficient. On the other hand, if the polymerization degree is too large, the workability tends to deteriorate at the time of forming a polyimide coating film. The reaction temperature of the tetracarboxylic acid derivative and the diamine can be selected from −20° C. to 150° C., preferably from −5° C. to 100° C. The polymerization degree of the polyamic acid, which is the product by the reaction of the tetracarboxylic acid derivative and the diamine, is preferably from 0.05 to 5.0 dl/g, more preferably from 0.5 to 2.0 dl/g, as represented by the reduced viscosity of the polyamic acid solution.

As specific examples of the tetracarboxylic dianhydride having $R^8$, dianhydrides of the following tetracarboxylic acids may be mentioned. An aromatic tetracarboxylic acid such as pyromellitic acid, 2,3,6,7-naphthalene tetracarboxylic acid, 1,2,5,6-naphthalene tetracarboxylic acid, 1,4,5,8-naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,3',4-biphenyl tetracarboxylic acid, bis(3,4-dicarboxyphenyl)ether, 3,3',4,4'-benzophenone tetracarboxylic acid, bis(3,4-dicarboxyphenyl)sulfone, bis(3,4-dicarboxyphenyl)methane, 2,2-bis(3,4-dicarboxyphenyl)propane 1,1,1,3,3,3-hexafluoro-2,2'-bis(3,4-dicarboxyphenyl)propane, bis(3,4-dicarboxyphenyl)dimethylsilane, bis(3,4-dicarboxyphenyl)diphenylsilane, 2,3,4,5-pyridine tetracarboxylic acid or 2,6-bis(3,4-dicarboxyphenyl)pyridine; an alicyclic tetracarboxylic acid such as 1,2,3,4-cyclobutane tetracarboxylic acid, 1,2,3,4-tetramethyl-1,2,3,4-cyclobutane tetracarboxylic acid, 1,2-dimethyl-1,2,3,4-cyclobutane tetracarboxylic acid, 1,3-dimethyl-1,2,3,4-cyclobutane tetracarboxylic acid, 1,2,3,4-cycloheptane tetracarboxylic acid, 2,3,4,5-tetrahydrofurane tetracarboxylic acid, 1,2,4,5-cyclohexane tetracarboxylic acid, 3,4-dicarboxy-1-cyclohexyl succinic acid, 3,4-dicarboxy-1,2,3,4-tetrahydro-1-naphthalene succinic acid, bicyclo[3,3,0]octane-2,4,6,8-tetracarboxylic acid, bicyclo[4,3,0]nonane-2,4,7,9-tetracarboxylic acid, bicyclo[4,4,0]decane-2,4,7,9-tetracarboxylic acid, bicyclo[4,4,0]decane-2,4,8,10-tetracarboxylic acid or tricyclo[6.3.0.0<2,6>]undecane-3,5,9,11-tetracarboxylic acid; an aliphatic tetracarboxylic acid such as butane tetracarboxylic acid, and the like.

Among them, from the viewpoint of obtaining a high voltage retention ratio and a low accumulation voltage characteristic, $R^8$ is preferably at least one of the following structures:

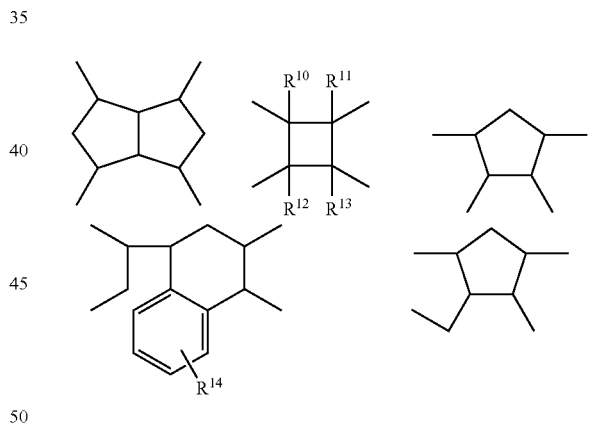

wherein each of $R^{10}$, $R^{11}$, $R^{12}$, $R^{13}$ and $R^{14}$ is independently hydrogen or a methyl group.

The acid dianhydride having such a structure is preferably a tetracarboxylic dianhydride selected from the group consisting of bicyclo[3,3,0]octane-2,4,6,8-tetracarboxylic dianhydride, 1,2,3,4-cyclobutane tetracarboxylic dianhydride, 1,2,3,4-tetramethyl-1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,2,4,5-cyclohexane tetracarboxylic dianhydride, 3,4-dicarboxy-1-cyclohexyl succinic dianhydride and 3,4-dicarboxy-1,2,3,4-tetrahydro-1-naphthalene succinic dianhydride.

In the formula (IV), $R^9$ represents a bivalent organic group and as a specific example of the diamine having the bivalent organic group, the following may be mentioned. An aromatic diamine such as p-phenylenediamine, 1,4-bis(4-aminophenyl)benzene, 1,5-naphthalenediamine, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenylether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane or 1,1,1,3,3,3-hexafluoro-2,2-bis[4-(4-aminophenoxy)phenyl]propane; an alicyclic diamine such as diaminodicyclohexylmethane, diaminodicyclohexylether or diaminocyclohexane; and an aliphatic diamine such as 1,2-diaminoethane, 1,3-diaminopropane, 1,4-diaminobutane or 1,6-diaminohexane. And further, a diaminocyloxane such as one having the following structure (p is an integer of from 1 to 10):

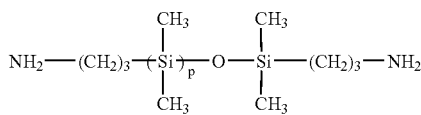

Further, $R^9$ may be an organic group having in its side chain structure at least one structural unit selected from the group consisting of $C_{5-20}$ long-chain alkyl, $C_{5-20}$ fluoroalkyl, alicyclic structures and aromatic ring structures. As a specific example of the diamine having $R^9$, the following may be mentioned. 1,3-diamino-4-dodecyloxybenzene, 1,3-diamino-4-hexadecyloxybenzene, 1,3-diamino-4-octadecyloxybenzene, 1,1-bis(4-aminophenyl)cyclohexane, 2,2-bis[4-(4-aminophenoxy)phenyl]octane, 4,4'-diamino-3-dodecyldiphenyl ether, 4-(4-trans-n-heptylcyclohexylphenoxy)-1,3-diaminobenzene, 4-(4-trans-n-pentylcyclohexylphenoxy)-1,3-diaminobenzene, 4-trans-n-pentylbicyclohexyl-3,5-diaminobenzoate or a diaminobenzene derivative having the following structure, and further a diaminobenzene derivative having a cholesterol skeleton in its side chain may, for example, be mentioned:

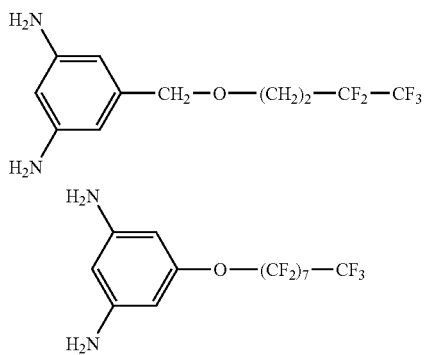

However, in $R^9$ of the formula (IV), the molar ratio of $R^9$ is having such a side chain substituent has to be lower than the molar ratio of $R^2$ having such a side-chain substituent in $R^2$ of the formula (I), and specifically it is preferably at most 20 mol %. In a case where a coating film is formed from a solution having at least 2 resin components including the polyamic acid of the formula (I) or the polyimide having the polyamic acid cyclodehydrated, a resin component having the lowest surface energy tends to segregate on the surface of the coating film. On the other hand, if the molar ratio of $R^9$ having a side-chain substituent in $R^9$ of the formula (IV) is higher than the molar ratio of $R^2$ having a side-chain substituent in $R^2$ of the formula (I), the polyamic acid represented by the formula (IV) tends to segregate on the surface layer during formation of a coating film, whereby a problem of deterioration of the voltage retention property may occur.

On the other hand, by incorporating at least 10 mol % of a bivalent organic group having the side-chain substituents, as $R^9$ of the polyamic acid represented by the formula (IV), the compatibility is improved in the solution with the polyamic acid of the formula (I) or the polyimide having the polyamic acid cyclodehydrated, whereby uniformity as a solution is improved. Accordingly, in a case where the solution tends to undergo phase separation, and printing failure is consequently likely to occur, when the liquid crystal alignment treating agent for vertical alignment of the present invention is prepared by mixing the polyamic acid of the formula (I) or the polyimide having the polyamic acid cyclodehydrated, with the polyamic acid represented by the formula (IV) in the solution, it is advisable to introduce, as $R^9$ in the formula (IV), $R^9$ having the above side-chain substituents. The molar ratio of $R^9$ having the side-chain substituents is preferably at most 20 mol %, particularly preferably from 10 to 20 mol %, of $R^9$ in the formula (IV).

In the case where the polyamic acid represented by the formula (IV) is mixed with the polyamic acid represented by the formula (I) or the polyimide having the polyamic acid cyclodehydrated, the mixed ratio is such that the polyamic acid represented by the formula (I) or the polyimide having the polyamic acid cyclodehydrated is preferably from 10 wt % to 99 wt %, further preferably from 20 wt % to 90 wt % in the total amount of both, from the viewpoint of obtaining uniform alignment of liquid crystal. If the mixed ratio is less than 10 wt %, there may be a case where a sufficiently high voltage retention ratio can not be obtained.

The concentration of the polyamic acid or the polyimide contained in the liquid crystal alignment treating agent of the present invention is not particularly limited, but it is preferably from 1 to 20 wt %, and more preferably from 2 to 10 wt %.

The solvent contained in the liquid crystal alignment treating agent of the present invention may be any one, so long as it is capable of dissolving the polyamic acid represented by the formula (I) or the polyimide having the polyamic acid cyclodehydrated, and further capable of dissolving the polyamic acid represented by the formula (IV). As its example, 2-pyrrolidone, N-methyl-2-pyrrolidone, N-ethyl-2-pyrrolidone, N-vinyl-2-pyrrolidone, N,N-dimethyl-acetamide, N,N-dimethyl-formamide or γ-butyrolactone may, for example, be mentioned. With a view to obtaining uniform printing properties, it is preferred that from 20 to 80 wt % of the total amount of the solvent is at least one solvent selected from N-methyl-2-pyrrolidone and γ-butyrolactone.

Further, even a solvent which does not dissolve the polyamic acid by itself, may be used in addition to the above solvent so long as the solubility is not thereby impaired. As such an example, a solvent such as ethyl cellosolve, butyl cellosolve, ethyl carbitol, butyl carbitol, ethyl carbitol acetate, ethylene glycol, a propylene glycol derivative as disclosed in JP-A-7-109438 or a lactic acid derivative as disclosed in JP-A-7-228839 may, for example, be mentioned. It is preferred that from 80 to 20 wt % of the total amount of the solvent is at least one member selected from the group consisting of butyl cellosolve, dipropylene glycol monomethyl ether and diethylene glycol diethyl ether.

Further, for the purpose of further improving adhesion between the polyamic acid or polyimide film and the substrate, an additive such as a coupling agent may be added to the obtained solution. As a specific example, the followings may be mentioned. 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxy silane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, ethyleneglycoldiglycidyl ether, polyethyleneglycol diglycidyl ether, propyleneglycol diglycidyl ether, tripropyleneglycol diglycidyl ether, polypropyleneglycol diglycidyl ether, neopentylglycol diglycidyl ether, 1,6-hexanediol diglycidyl ether, glycerin diglycidyl ether, 2,2-dibromoneopentylglycol diglycidyl ether, 1,3,5,6-tetraglycidyl-2,4-hexanediol, N,N,N',N',-tetraglycidyl-m-xylenediamine, 1,3-bis(N,N-diglycidylaminomethyl)cyclohexane, N,N,N',N',-tetraglycidyl-4,4'-diaminodiphenylmethane, etc. The content of such a functional silane-containing or an epoxy group-containing compound is preferably from 0.1 to 30 wt %, more preferably from 1 to 20 wt %, to the total polymer weight in the solution.

The liquid crystal alignment treating agent of the present invention may be coated on a substrate such as a glass substrate provided with electrodes having irregularities, a glass substrate provided with a color filter or a glass substrate provided with electrodes having a pattern formed, usually by a method such as spin coating or a printing method. However, the printing method is preferred from the viewpoint of productivity. Such a printing method is usually carried out at a temperature of from 20 to 30° C. at a humidity of at most 60%. The coated liquid crystal alignment treating agent is subjected to drying treatment by using a hotplate or an oven at a temperature of from 40 to 120° C., and then fired by using the hotplate or the oven to form a liquid crystal alignment film. The firing temperature at that time can be optionally selected from 120 to 350° C. From the point of the heat resistance of the side chain structure, it is preferably at most 250° C. Further, the firing time can be optionally selected from 3 to 180 minutes including the temperature-raising and lowering periods. Further, the surface of the alignment film may be subjected to rubbing treatment by employing a rayon or a cotton cloth. However, with respect to a liquid crystal alignment film for vertical alignment, it is difficult to obtain a uniform alignment state by means of the rubbing treatment. Accordingly, it is preferred to use the liquid crystal alignment film obtained from the liquid crystal alignment treating agent for vertical alignment of the present invention without rubbing.

The liquid crystal cell of the present invention can be prepared by means of a usual method, and the preparation method is not particularly limited. Usually, a sealing agent is coated on a glass substrate having a liquid crystal alignment film formed on at least one of the pair of substrates, and then two sheets of substrates are bonded together through spacers dispersed so as to maintain a constant gap, followed by curing the seal agent. Preliminarily, liquid crystal is injected from a liquid crystal injection inlet, and then the inlet is sealed to obtain a liquid crystal cell. As the liquid crystal, a fluorine-type liquid crystal or a cyano-type liquid crystal having a negative dielectric constant anisotropy may be used.

Now, the present invention will be described in further detail with reference to Examples. However, the present invention is by no means limited thereto. Here, bicyclo[3,3,0]-octane-2,4,6,8-tetracarboxylic acid dianhydride used in Examples, was one having an isomer (V) content of 98%.

EXAMPLE 1

18.77 g (0.075 mol) of bicyclo[3,3,0]-octane-2,4,6,8-tetracarboxylic dianhydride (hereinafter referred to simply as BODA), 5.40 g (0.05 mol) of p-phenylenediamine (hereinafter referred to simply as p-PD) and 18.83 g (0.05 mol) of 1,3-diamino-4-octadecyloxybenzene are reacted in 129 g of NMP for 3 hours at room temperature. To this reaction solution, is 4.90 g (0.025 mol) of 1,2,3,4-cyclobutane tetracarboxylic dianhydride (hereinafter referred to simply as CBDA) was added together with 63 g of NMP, and reacted for 6 hours to prepare a polyamic acid solution. The reduced viscosity of the obtained polyamic acid solution was 0.7 dl/g.

To 25 g of this polyamic acid solution, 35 g of NMP and 40 g of butyl cellosolve (hereinafter referred to simply as BC) were added to prepare a polyamic acid solution (PA-1) having a solid content concentration of 5%.

This solution was printed on a clean substrate having chromium vapor-deposited, to obtain a uniform coating film having no cissing or unevenness in the film thickness.

Further, this solution was spin-coated at a rate of 2000 rpm on a glass substrate provided with transparent electrodes, and fired at 180° C. for 60 minutes to obtain a polyimide film having a film thickness of 1000 Å. 6 μm of spacers were dispersed on the glass substrate provided with this coating film, and another glass substrate provided with the coating film was put together to form an unoccupied cell, to which a nematic liquid crystal (MLC-6608, manufactured by Merck Co.) having a negative dielectric constant anisotropy was injected to prepare a liquid crystal cell. This liquid crystal cell was observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured and found to show high values of 99% at 23° C., and 97.5% at 80° C. Further, the residual DC voltage of the liquid crystal cell was measured and found to show a low value of 0.1 V at 23° C.

Here, the voltage retention ratio of the liquid crystal cell was measured by applying ±4 V to the liquid crystal cell at a pulse width of 60 μs at a frequency of 30 Hz. Further, with respect to the residual DC voltage of the liquid crystal cell, the value after applying a direct voltage of 3 V for 30 minutes was measured by a flicker elimination method.

EXAMPLE 2

12.51 g (0.05 mol) of BODA, 2.16 g (0.02 mol) of p-PD and 30.13 g (0.08 mol) of 1,3-diamino-4-octadecyloxybenzene were reacted in 152 g of NMP for 3 hours at room temperature. To this reaction solution, 9.80 g (0.05 mol) of CBDA was added together with 60 g of NMP, and reacted for 6 hours to prepare a polyamic acid solution. The reduced viscosity. of the obtained polyamic acid solution was 0.6 dl/g.

To 25 g of this polyamic acid solution, 35 g of NMP and 40 g of BC were added to prepare a polyamic acid solution (PA-2) having a solid content concentration of 5%.

This solution was printed on a clean substrate having chromium vapor-deposited, to obtain a uniform coating film having no cissing or unevenness in the film thickness.

By using this solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97% at 80° C. Further, the residual DC voltage of the liquid crystal cell was measured, and found to show a low value of 0.1 V at 23° C.

EXAMPLE 3

30 g of the polyamic acid solution (PA-1) obtained in Example 1 was diluted with 70 g of NMP, and 3.2 g of acetic acid anhydride and 5.0 g of pyridine were added thereto as an imidation catalyst, and reacted for 30 minutes at room temperature and 2 hours at 90° C. to obtain a polyimide solution. This solution was filled into a large amount of methanol, and the obtained white precipitation was separated by filtration and dried over to obtain a white polyimide powder. It was confirmed that this polyimide powder was 75% imidated by means of $^1$H-NMR. 4 g of this powder was dissolved in 60 g of γ-butyrolactone (hereinafter referred to simply as γ-BL) and 16 g of BC was added to obtain a soluble polyimide solution having a solid content concentration of 5%.

This solution was printed on a clean substrate having chromium vapor-deposited, to obtain a uniform coating film having no cissing or unevenness in the film thickness.

By using this solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97.5% at 80° C. Further, the residual DC voltage of the liquid crystal cell was measured and found to show a low value of 0.05 V at 23° C.

EXAMPLE 4

30 g of the polyamic acid solution (PA-1) obtained in Example 1 was diluted with 70 g of NMP, and 3.2 g of acetic acid anhydride and 5.0 g of pyridine were added thereto as an imidation catalyst, and then reacted for 30 minutes at room temperature and 2 hours at 65° C. to obtain a polyimide solution. This solution was filled into a large amount of methanol, and the obtained white precipitation was separated by filtration and dried over to obtain a white polyimide powder. It was confirmed that this polyimide powder was 45% imidated by means of $^1$H-NMR.

4 g of this powder was dissolved in 52 g of γ-BL, 16 g of BC and 8 g of diethylene glycol diethyl ether (hereinafter referred to simply as DEDE) were added to obtain a soluble polyimide solution having a solid content concentration of 5%.

This solution was printed on a clean substrate having chromium vapor-deposited, a uniform coating film having no cissing or unevenness in the film thickness.

By using this solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97.5% at 80° C. Further, the residual DC voltage of the liquid crystal cell was measured and found to show 0 V at 23° C.

EXAMPLE 5

18.77 g (0.075 mol) of BODA, 9.91 g (0.05 mol) of di-(4-aminophenyl)-methane (hereinafter referred to simply as DDM) and 18.83 g (0.05 mol) of 1,3-diamino-4-octadecyloxybenzene were reacted in 143 g of NMP for 3 hours at room temperature. To this reacted solution, 4.90 g (0.025 mol) of CBDA was added together with 67 g of NMP, and reacted for 6 hours to prepare a polyamic acid solution. The reduced viscosity of the obtained polyamide acid solution was 0.6 dl/g.

30 g of this polyamic acid solution was diluted with 70 g of NMP, 2.9 g of acetic acid anhydride and 4.5 g of pyridine were added thereto as an imidation catalyst, and reacted for 30 minutes at room temperature and 2 hours at 90° C. to obtain a polyimide solution. This solution was filled into a large amount of methanol, and the obtained white precipitation was separated by filtration and dried over to obtain a white polyimide. It was confirmed that this polyimide powder was 70% imidated by means of $^1$H-NMR.

4 g of this powder was dissolved in 60 g of γ-BL, and then 16 g of BC was added to obtain a soluble polyimide solution having a solid content concentration of 5%.

This solution was printed on a clean substrate having chromium vapor-deposited, to obtain a uniform coating film having no cissing or unevenness in the film thickness.

By using this solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97% at 80° C. Further, the residual DC voltage of the liquid crystal cell was measured and found to show 0 V at 23° C.

EXAMPLE 6

18.77 g (0.075 mol) of BODA, 7.91 g (0.05 mol) of 1,5-diaminonaphthalene and 18.83 g (0.05 mol) of 1,3-diamino-4-octadecyloxybenzene were reacted in 137 g of NMP for 3 hours at room temperature. To this reacted solution, 4.90 g (0.025 mol) of CBDA and 65 g of NMP were added thereto, and reacted for 6 hours to prepare a polyamic acid solution. The reduced viscosity of the obtained polyamide acid solution was 0.5 dl/g.

30 g of this polyamic acid solution was diluted with 70 g of NMP, 3.0 g of acetic acid anhydride and 4.7 g of pyridine were added thereto as an imidation catalyst, and then reacted for 30 minutes at room temperature and 2 hours at 90° C. to obtain a polyimide solution. This solution was filled into a large amount of methanol, and the obtained white precipitation was separated by filtration and dried over to obtain a white polyimide powder. It was confirmed that this polyimide powder was 70% imidated by means of $^1$H-NMR.

4 g of this powder was dissolved in 52 g of γ-BL, and then 16 g of BC and 8 g of DEDE were added thereto to obtain a soluble polyimide solution having a solid content concentration of 5%.

This solution was printed on a clean substrate having chromium vapor-deposited, to obtain a uniform coating film having no cissing or unevenness in the film thickness.

By using this solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97% at 80° C. Further, the residual DC voltage of the liquid crystal cell was measured and found to show 0.1 V at 23° C.

EXAMPLE 7

To 92 g of NMP, 14.62 g (0.05 mol) of 1,4-bis(aminophenoxy)benzene was dissolved in, and 12.51 g (0.05 mol) of BODA was added together with 62 g of NMP thereto, and reacted for 3 hours at 80° C. and for 15 hours at room temperature to prepare a polyamic acid solution. The reduced viscosity of the obtained polyamic acid solution was 1.0 dl/g.

To 34 g of this polyamic acid solution, 26 g of NMP and 40 g of BC were added, and a polyamic acid solution (PA-3) having a solid content concentration of 5% was prepared.

10 g of the polyamic acid solution (PA-3) and 40 g of the polyamic acid solution (PA-1) prepared in Example 1 were mixed for 20 hours at room temperature.

This mixed solution was printed on a clean substrate having chromium vapor-deposited, to obtain a uniform coating film having no cissing or unevenness in the film thickness.

By using the mixed solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C., and 97.5% at 80° C. Further, the residual DC voltage of the liquid crystal cell was measured and found to show 0 V at 23° C.

EXAMPLE 8

10 g of the polyamic acid solution (PA-3) prepared in Example 7 and 40 g of the polyamic acid solution (PA-2) prepared in Example 2 were mixed for 20 hours at room temperature.

This mixed solution was printed on a clean substrate having chromium vapor-deposited, to obtain a uniform coating film having no cissing or unevenness in the film thickness.

Further, by using the mixed solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and found to show high values of 99% at 23° C.m and 97% at 80° C. Further, the residual DC voltage of the liquid crystal cell was measured and found to show 0 V at 23° C.

COMPARATIVE EXAMPLE 1

19.61 g (0.10 mol) of CBDA, 4.32 g (0.04 mol) of p-PD and 22.60 g (0.06 mol) of 1,3-diamino-4-octadecyloxybenzene were reacted in 264 g of NMP for 6 hours at room temperature to prepare a polyamic acid solution. 34 g of the polyamic acid solution was diluted with 36 g of NMP and 30 g of BC to obtain a polyamic acid solution having the solid content concentration of 5%.

This solution was spin-coated at a rate of 3500 rpm on a glass substrate provided with transparent electrodes, and fired for 60 minuets at 180° C. to obtain a polyimide film having a film thickness of 1000 Å.

A liquid crystal cell was prepared in the same manner as in Example 1, and then the voltage retention ratio was measured, and was found to show 98.5% at 23° C. and 95% at 80° C. Further, the residual DC voltage of the liquid crystal cell was measured and found to show a high residual DC voltage of 0.5 V at 23° C.

COMPARATIVE EXAMPLE 2

19.61 g (0.10 mol) of CBDA, 7.92 g (0.04 mol) of DDM and 22.60 g (0.06 mol) of 1,3-diamino-4-octadecyloxybenzene were reacted in 264 g of NMP for 6 hours at room temperature to prepare a polyamic acid solution. 31 g of the polyamic acid solution was diluted with 39 g of NMP and 30 g of BC to obtain a polyamic acid solution having the solid content concentration of 5%. This solution was spin-coated at a rate of 3500 rpm on a glass substrate provided with transparent electrodes, and fired for 60 minutes at 180° C. to obtain a polyimide film having a film thickness of 1000 Å.

A liquid crystal cell was prepared in the same manner as in Example 1, and then the voltage retention ratio was measured, and was found to show 98.5% at 23° C. and 95% at 80° C. Further, the residual DC voltage of the liquid crystal cell was measured and found to show a high residual DC voltage of 0.6 V at 23° C.

EXAMPLE 9

40 g of the polyamic acid solution (PA-3) prepared in Example 7 and 10 g of the polyamic acid solution (PA-2) prepared in Example 2 were mixed for 20 hours at room temperature.

This mixed solution was printed on a clean substrate having chromium vapor-deposited, to obtain a uniform coating film having no cissing or unevenness in the film thickness.

Further, by using the mixed solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show 99% at 23° C., and 97% at 80° C. Further, the residual DC voltage of the liquid crystal cell was measured and found to show 0 V at 23° C.

EXAMPLE 10

In 92 g of NMP, 14.62 g (0.05 mol) of 1,3-bis(aminophenoxy)benzene was dissolved, then 9.75 g (0.05 mol) of CBDA was added with 46 g of NMP thereto, and then reacted for 6 hours at room temperature to prepare a polyamic acid solution. A reduced viscosity of the obtained polyamic acid solution was 1.0 dl/g.

To 33 g of the polyamic acid solution, 27 g of NMP and 40 g of BC were added to prepare a polyamic acid solution (PA-4) having a solid content concentration of 5%.

40 g of the polyamic acid solution (PA-4) and 10 g of the polyamic acid solution (PA-1) prepared in Example 1 were mixed for 20 hours at room temperature.

This mixed solution was printed on a clean substrate having chromium vapor-deposited, to obtain a uniform coating film having no cissing or unevenness in the film thickness.

Further, by using the mixed solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show 99% at 23° C., and 97.5% at 80° C. Further, the residual DC voltage of the liquid crystal cell was measured and found to show 0 V at 23° C.

EXAMPLE 11

25.02 g (0.10 mol) of BODA, 2.16 g (0.02 mol) of p-PD and 30.13 g (0.08 mol) of 1,3-diamino-4-octadecyloxybenzene were reacted in 229 g of NMP for 9 hours at room temperature, but the polymerization reaction was hardly proceeded. Therefore, the solution temperature was risen to up to 80° C., and further reacted for 24 hours to prepare a polyamic acid solution. The reduced viscosity of the obtained polyamic acid solution was 0.5 dl/g.

30 g of the polyamic acid solution was diluted with 70 g of NMP, and 3.0 g of acetic acid anhydride and 4.7 g of pyridine were added thereto as an imidation catalyst, and then reacted for 30 minutes at room temperature and 2 hours at 90° C. to obtain a polyimide solution. The solution was filled into a large amount of methanol, and the obtained white precipitation was separated by filtration and dried over to obtain a white polyimide powder. It was confirmed that the polyimide powder was 45% imidated by means of $^1$H-NMR.

4 g of the powder was dissolved in 8 g of NMP and 52 g of γ-BL, and then 16 g of dipropylene glycol monomethyl ether was added thereto to obtain a soluble polyimide solution having a solid content concentration of 5%.

This solution was printed on a clean substrate having chromium vapor-deposited, a uniform coating film having no cissing or unevenness in the film thickness.

By using the mixed solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show high values of 99% at 23° C., and 98% at 80° C. Further, the residual DC voltage of the liquid crystal cell was measured and found to show a low value of 0 V at 23° C.

EXAMPLE 12

18.77 g (0.075 mol) of BODA, 7.57 g (0.07 mol) of p-PD and 11.42 g (0.03 mol) of 4-(4-trans-n-heptylcyclohexylphenoxy)-1,3-diaminobenzene were reacted in 120 g of NMP for 3 hours at room temperature. To this reaction solution, 4.90 g (0.025 mol) of CBDA was added together with 51 g of NMP, and reacted for 6 hours to prepare a polyamic acid solution. The reduced viscosity of the obtained polyamic acid solution was 0.8 dl/g.

30 g of the polyamic acid solution was diluted with 70 g of NMP, and 3.0 g of acetic acid anhydride and 4.7 g of pyridine were added thereto as an imidation catalyst, and then reacted for 30 minutes at room temperature and 2 hours at 65° C. to obtain a polyimide solution. This solution was filled into a large amount of methanol, and the obtained white precipitation was separated by filtration and dried over to obtain a white polyimide powder. It was confirmed that this polyimide powder was 45% imidated by means of $^1$H-NMR.

4 g of this powder was dissolved in 8 g of NMP and 52 g of γ-BL, and then 16 g of dipropylene glycol monomethyl ether was added thereto to obtain a soluble polyimide solution having a solid content concentration of 5%.

This solution was printed on a clean substrate having chromium vapor-deposited, to obtain a uniform coating film having no cissing or unevenness in the film thickness.

By using the solution, the liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show high values of 99% at 23° C., and 98% at 80° C. Further, the residual DC voltage of the liquid crystal cell was measured and found to show a low value of 0 V at 23° C.

EXAMPLE 13

25.02 g (0.10 mol) of BODA, 7.57 g (0.07 mol) of p-PD and 11.60 g (0.03 mol) of 4-trans-N-pentylbicyclohexyl-3,5-diaminobenzoate were reacted in 177 g of NMP for 24 hours at 80° C. to prepare a polyamic acid solution. The reduced viscosity of the obtained polyamic acid solution was 0.8 dl/g.

30 g of the polyamic acid solution was diluted with 70 g of NMP, and 3.0 g of acetic acid anhydride and 4.7 g of pyridine were added thereto as an imidation catalyst, and then reacted for 30 minutes at room temperature and 2 hours at 90° C. to obtain a polyimide solution. The solution was filled into a large amount of methanol, and then the obtained white precipitation was separated by filtration and dried over to obtain a white polyimide powder. It was confirmed that the polyimide powder was 45% imidated by means of $^1$H-NMR.

4 g of this powder was dissolved in 8 g of NMP and 52 g of γ-BL, and then 16 g of dipropylene glycol monomethyl ether was added thereto to obtain a soluble polyimide solution having a solid content concentration of 5%.

This solution was printed on a clean substrate having chromium vapor-deposited, to obtain a uniform coating film having no cissing or unevenness in the film thickness.

By using the solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show high values of 99% at 23° C., and 97% at 80° C. Further, the residual DC voltage of the liquid crystal cell was measured and found to show a low value of 0.1 V at 23° C.

EXAMPLE 14

6.26 g (0.025 mol) of BODA, 5.41 g (0.05 mol) of p-PD and 18.83 g (0.05 mol) of 1,3-diamino-4-octadecyloxybenzene were reacted in 175 g of NMP for 3 hours at room temperature. To this reaction solution, 33.32 g (0.075 mol) of 1,1,1,3,3,3-hexafluoro-2,2'-bis(3,4-dicarboxyphenyl)propanic dianhydride was added thereto together with 80 g of NMP, and then reacted for 6 hours to prepare a polyamic acid solution. The reduced viscosity of the obtained polyamic acid solution was 0.6 dl/g.

30 g of the polyamic acid solution was diluted with 70 g of NMP, and then 3.2 g of acetic acid anhydride and 5.0 g of pyridine were added thereto as an imidation catalyst, and then reacted for 30 minutes at room temperature and 2 hours at 90° C. to obtain a polyimide solution. This solution was filled into a large amount of methanol, and then the obtained white precipitation was separated by filtration and dried over to obtain a white polyimide powder. It was confirmed that the polyimide powder was 75% imidated by means of $^1$H-NMR.

4 g of the powder was dissolved in 60 g of γ-BL, and then 16 g of BC was added thereto to obtain a soluble polyimide solution having a solid content concentration of 5%.

This solution was printed on a clean substrate having chromium vapor-deposited, to obtain a uniform coating film having no cissing or unevenness in the film thickness.

By using the solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show high values of 99% at 23° C., and 96% at 80° C. Further, the residual DC voltage of the liquid crystal cell was measured and found to show a low value of 0.15 V at 23° C.

EXAMPLE 15

10 g of the polyimide solution prepared in Example 3 and 40 g of the polyamic acid solution (PA-4) prepared in Example 10 were mixed for 20 hours at room temperature.

This mixed solution was printed on a clean substrate having chromium vapor-deposited, to obtain a uniform coating film having no cissing or unevenness in the film thickness.

By using the solution, a liquid crystal cell was prepared in the same manner as in Example 1, and observed by a polarization microscope, whereby no alignment defect was observed, and an isogyre was observed at the center of the visual field, whereby it was confirmed that liquid crystal was uniformly vertically-aligned in this liquid crystal cell.

With respect to this liquid crystal cell, the voltage retention ratio was measured, and was found to show high values of 99% at 23° C., and 97.5% at 80° C. Further, the residual DC voltage of the liquid crystal cell was measured and found to show 0 V at 23° C.

INDUSTRIAL APPLICABILITY

The liquid crystal alignment treating agent of the present invention can form a liquid crystal alignment film for vertical alignment, wherein coating film uniformity at the time of printing is excellent, and even if it is an alignment film, in which the imidation reaction is not sufficiently proceeded, it is excellent in voltage retention properties, and especially excellent in voltage retention properties at a high temperature, and has a low accumulation voltage in a liquid crystal display device, and therefore, an excellent liquid crystal display device can be obtained.

What is claimed is:
1. A liquid crystal alignment treating agent for vertical alignment to be used in a liquid crystal display device which has an electrode on at least one side of substrates and is driven by applying a voltage to a vertically aligned liquid crystal, characterized by containing a polyamic acid which is represented by the following formula (I) and exhibits a reduced viscosity of from 0.05 to 5.0 dl/g (in N-methyl-2-pyrrolidone at 30° C. at a concentration of 0.5 g/dl) or a polyimide obtained by cyclodehydration thereof:

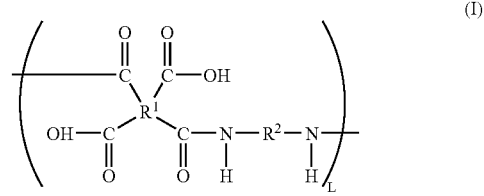

(I)

wherein R$^1$ represents a tetravalent organic group, comprising 20 mol % to 99 mol % of a fused alicyclic structure composed of two to five rings and all of the carbonyl groups are directly bonded to the alicyclic structure and that any two carbonyl groups are not bonded to adjacent carbon atoms of the alicyclic structure with the remainder being selected from the group consisting of

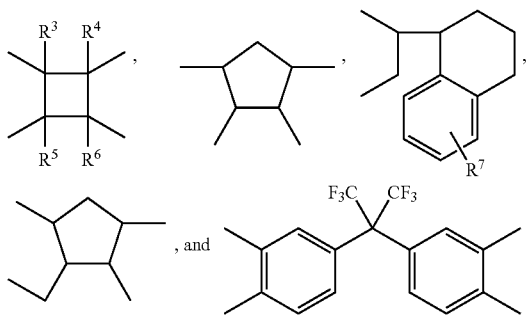

wherein each of $R^3$, $R^4$, $R^5$, $R^6$ and $R^7$ is independently hydrogen or a methyl group; and wherein $R^2$ is a bivalent organic group, from 20 to 100 mol % of which has in the side-chain structure at least one structural unit selected from the group consisting of $C_{5-20}$ long-chain alkyl, $C_{5-20}$ fluoroalkyl, alicyclic structures and aromatic ring structures; and L is a positive integer.

2. The liquid crystal alignment treating agent for vertical alignment according to claim 1, wherein at least 20 mol % of $R^1$ in the formula (I) is a tetravalent organic group represented by the following formula (II):

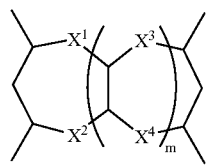

(II)

wherein each of $X^1$, $X^2$, $X^3$ and $X^4$ is independently a single bond or a methylene bond; and m is an integer of from 1 to 3.

3. The liquid crystal alignment treating agent for vertical alignment according to claim 1, wherein at least 20 mol % of $R^1$ in the formula (I) is a tetravalent organic group represented by the following structure (III):

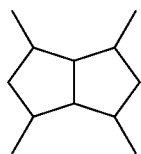

(III)

4. The liquid crystal alignment treating agent for vertical alignment according to claim 1, which comprises a polyamic acid which is represented by the formula (I) or a polyimide obtained by cyclodehydration thereof, and a polyamic acid which is represented by the following formula (IV) and exhibits a reduced viscosity of from 0.05 to 5.0 dl/g (in N-methyl-2-pyrrolidone at 30° C. at a concentration of 0.5 g/dl):

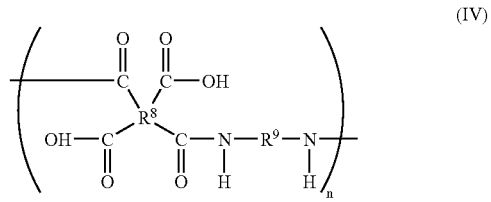

(IV)

wherein $R^8$ is a tetravalent organic group; $R^9$ is a bivalent organic group; and n is a positive integer.

5. The liquid crystal alignment treating agent for vertical alignment according to claim 4, wherein $R^8$ in the formula (IV) is a tetravalent organic group selected from at least one kind of the following structures:

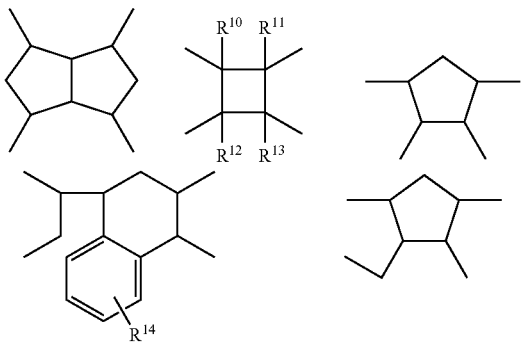

wherein each of $R^{10}$, $R^{11}$, $R^{12}$, $R^{13}$ and $R^{14}$ is independently hydrogen or a methyl group.

6. The liquid crystal alignment treating agent for vertical alignment according to claim 4, wherein the amount of the polyamic acid which is represented by the formula (I) or the polyimide obtained by cyclodehydration thereof is from 10 to 99 wt % to the total amount of the polyamic acid which is represented by the formula (I), the polyimide obtained by cyclodehydration thereof and the polyamic acid which is represented by the formula (IV).

7. The liquid crystal alignment treating agent for vertical alignment according to claim 1, wherein of the solvent contained therein, 20 to 80 wt % is at least one kind of solvents selected from N-methyl-2-pyrrolidone or γ-butyrolactone, and 80 to 20 wt % is at least one solvent selected from butyl cellosolve, propylene glycol monomethyl ether or diethylene glycol diethyl ether.

8. A liquid crystal alignment film characterized in that the liquid crystal alignment treating agent for vertical alignment recited in any one of claims 1 to 3 and 4 to 7 is coated on a substrate, followed by firing to form the film.

9. A liquid crystal display device characterized by using the liquid crystal alignment film recited in claim 8.

* * * * *